(12) United States Patent
Park et al.

(10) Patent No.: US 8,368,255 B2
(45) Date of Patent: Feb. 5, 2013

(54) VOICE COIL MOTOR

(75) Inventors: Sangok Park, Seoul (KR); Seongmin Lee, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 209 days.

(21) Appl. No.: 12/950,370

(22) Filed: Nov. 19, 2010

(65) Prior Publication Data

US 2011/0121666 A1 May 26, 2011

(30) Foreign Application Priority Data

Nov. 20, 2009 (KR) .................. 10-2009-0112609

(51) Int. Cl.
*H02K 41/03* (2006.01)
*H02K 33/00* (2006.01)
(52) U.S. Cl. ...................... 310/12.16; 310/15
(58) Field of Classification Search .......... 310/15–37, 310/12.16; 359/824
See application file for complete search history.

(56) References Cited

U.S. PATENT DOCUMENTS

| | | | |
|---|---|---|---|
| 7,227,285 B2 * | 6/2007 | Osaka | 310/15 |
| 7,463,436 B2 * | 12/2008 | Takahashi et al. | 359/824 |
| 7,638,906 B2 * | 12/2009 | Liu et al. | 310/15 |
| 7,880,982 B2 * | 2/2011 | Otsuki et al. | 359/819 |
| 7,932,648 B2 * | 4/2011 | Jung | 310/15 |
| 2008/0036307 A1 * | 2/2008 | Lu et al. | 310/15 |
| 2009/0237815 A1 * | 9/2009 | Kim | 359/811 |

FOREIGN PATENT DOCUMENTS

JP 2009271204 A * 11/2009

OTHER PUBLICATIONS

Machine Translation JP 2009271204 A, Aug. 12, 2012.*

* cited by examiner

*Primary Examiner* — Tran N. Nguyen
*Assistant Examiner* — Thomas Truong
(74) *Attorney, Agent, or Firm* — Saliwanchik, Lloyd & Eisenschenk

(57) ABSTRACT

A VCM is disclosed, the VCM including a bobbin formed with a coil at an outer surface thereof; at least one permanent magnet facing the coil formed at the bobbin; a cylindrical yoke encompassing the bobbin and the permanent magnet and including a metal member for blocking a magnetic field generated by the coil; a base coupled to the yoke; and an elastic member including a first elastic member interposed between the yoke and the permanent magnet for elastically supporting the bobbin and a second elastic member interposed between the base and the permanent magnet.

12 Claims, 2 Drawing Sheets

VOICE COIL MOTOR

CROSS-REFERENCE TO RELATED APPLICATION

This application claims the benefit under 35 U.S.C. §119 of Korean Patent Application No. 10-2009-0112609, filed Nov. 20, 2009, which is hereby incorporated by reference in its entirety.

BACKGROUND OF THE DISCLOSURE

1. Field of the Invention

The present disclosure relates to a voice coil motor.

2. Discussion of the Related Art

In general, a small optical device such as a camera on a mobile phone or a digital camera is formed with an actuator for adjusting magnification and focus. The camera on the mobile phone or the digital camera recently employs an actuator such as a VCM (voice coil motor) on a wide range base.

The VCM is a motor that uses a vibration plate of a speaker by utilizing the magnetic field generated by a current flowing in a voice coil of a speaker and a magnetic field generated by a permanent magnet. The VCM is advantageous in that it consumes less electric power, is less voluminous and inexpensive and has a high accuracy in operation displacement, such that the VCM is adequate in adjusting a gap between a lens and an image sensor in a camera module.

The VCM includes a base, a rotor, a stator, a yoke and a housing. The rotor is arranged on the base, the rotor lifts up and down relative to the stator, the yoke covers the rotor and the stator and the housing is directly connected to the base to cover the rotor, the stator and the yoke. In a case a housing made of synthetic resin is used in the conventional VCM, the housing in the camera module cannot block the electromagnetic wave generated from various elements in a confined space and area. Furthermore, the voluminous housing can hardly increase size of a permanent magnet and a coil formed inside the yoke to produce a weak driving power. Still furthermore, the VCM is susceptible to impact and/or vibration due to the housing fixing the yoke being made of synthetic resin.

BRIEF SUMMARY

The present disclosure is directed to cope with the above-mentioned problems and to provide a VCM (voice coil motor) configured to reduce the number of constituent parts, to increase the size of a permanent magnet and a coil and to inhibit the constituent parts from being damaged by outside shock, by changing structure of a yoke such that the yoke can function as a housing.

Technical problems to be solved by the present disclosure are not restricted to the above-mentioned description, and any other technical problems not mentioned so far will be clearly appreciated from the following description by the skilled in the art.

In one general aspect of the present disclosure, there is provided a VCM, comprising: a bobbin formed with a coil at an outer surface thereof; at least one permanent magnet facing the coil formed at the bobbin; a cylindrical yoke encompassing the bobbin and the permanent magnet and including a metal member for blocking a magnetic field generated by the coil; a base coupled to the yoke; and an elastic member including a first elastic member interposed between the yoke and the permanent magnet for elastically supporting the bobbin and a second elastic member interposed between the base and the permanent magnet.

In some exemplary embodiments of the present disclosure, a part of the yoke may be interposed between a periphery of the bobbin and the coil.

In some exemplary embodiments of the present disclosure, the bobbin may be formed with a sill configured to support a lower end of the coil.

In some exemplary embodiments of the present disclosure, the yoke may include an outer yoke including an upper plate formed with an opening for opening an upper end of the bobbin and a lateral plate extended from the upper plate to the base and coupled to the base, and an inner yoke extended from an inner surface formed by the opening of the upper plate to between the coil and a periphery of the bobbin.

In some exemplary embodiments of the present disclosure, the permanent magnet may be arranged at a position opposite to each inner yoke.

In some exemplary embodiments of the present disclosure, the VCM may further include a first spacer interposed between the yoke and the permanent magnet, and a second spacer interposed between the permanent magnet and the base.

In some exemplary embodiments of the present disclosure, the first spacer may include a first frame unit interposed between the yoke and the permanent magnet and a first support pillar extended from the first frame unit to the base, and the second spacer may include a second frame unit interposed between the base and the permanent magnet and a second support pillar extended from the second frame unit to the first support pillar.

In some exemplary embodiments of the present disclosure, the permanent magnet may be fixed between the first and second frame units.

In some exemplary embodiments of the present disclosure, the first elastic member may include an outer spring coupled to the first frame unit, an inner spring coupled to the bobbin and a connection spring connecting the outer spring and the inner spring.

In some exemplary embodiments of the present disclosure, the outer spring may be inserted into an inner surface of the first frame unit.

In some exemplary embodiments of the present disclosure, the connection spring may be bent in a zigzag style between the inner spring and the outer spring, and a part of the yoke may pass between the connection spring to be interposed between the bobbin and the coil.

In some exemplary embodiments of the present disclosure, the bobbin may be formed with at least one rib, where the rib is coupled to the inner spring.

In some exemplary embodiments of the present disclosure, the outer spring, the inner spring and the connection spring of the first elastic member may be integrally formed.

In some exemplary embodiments of the present disclosure, the base may be laterally formed with a sill for supporting the yoke.

The present disclosure thus configured is advantageous in that the number of constituent parts can be reduced, and the size of a permanent magnet and a coil can be increased to inhibit the constituent parts from being damaged by outside shock, by changing structure of a yoke such that the yoke can function as a housing.

BRIEF DESCRIPTION OF THE DRAWINGS

The accompanying drawings, which are included to provide a further understanding of the present disclosure and are incorporated in and constitute a part of this application, and together with the description serve to explain the principle of the disclosure. In the drawings.

DETAILED DESCRIPTION

Figure 1:
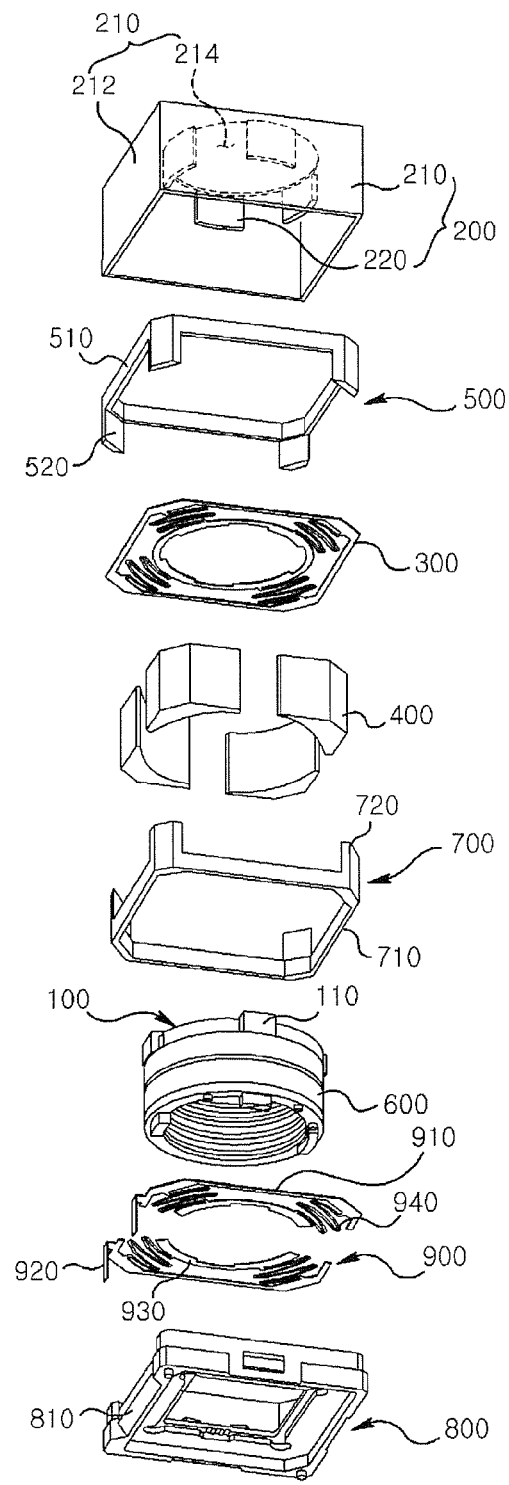
FIG. 1 is an exploded perspective view illustrating an entire configuration of a VCM according to an exemplary embodiment of the present invention.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Figure 2:
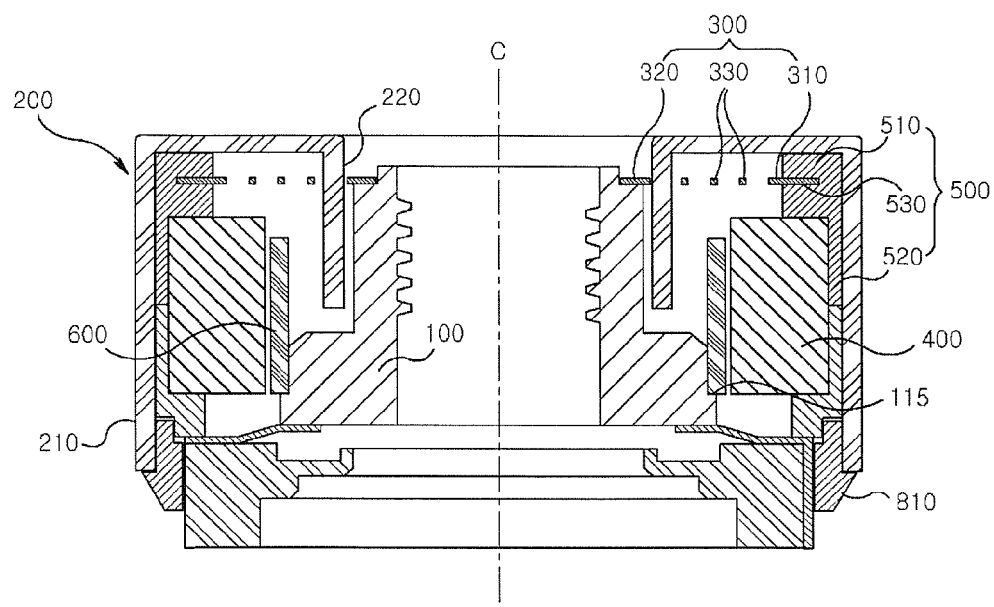
FIG. 2 is a conceptual cross-sectional view illustrating an entire configuration of a VCM according to an exemplary embodiment of the present invention.
Figure 3:
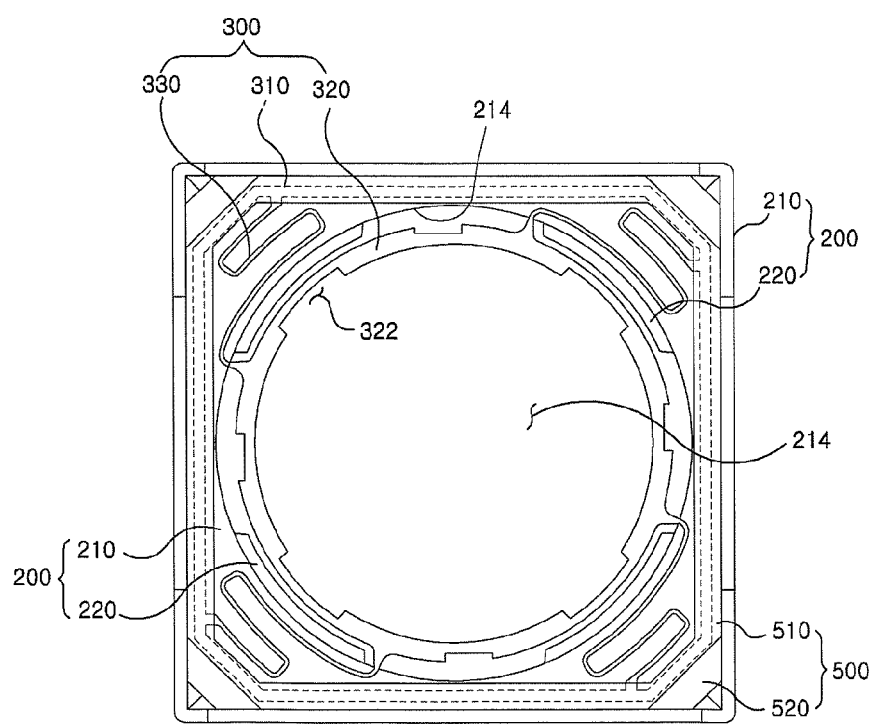
FIG. 3 is a conceptual view of a bottom surface illustrating a relationship between an inner yoke and a first elastic member, which are essential parts of the present disclosure.

FIG. 1 is an exploded perspective view illustrating an entire configuration of a VCM according to an exemplary embodiment of the present invention, FIG. 2 is a cross-sectional view illustrating an entire configuration of a VCM according to an exemplary embodiment of the present invention, and FIG. 3 is a plan view of a bottom surface illustrating a relationship between an inner yoke and a first elastic member, which are essential parts of the present disclosure.

The VCM (voice coil motor) according to the present disclosure may include a bobbin (100), a yoke housing (200), a first elastic member (300), a second elastic member (900), a permanent magnet (400), and a base (800).

The bobbin (100) may take the shape of a cylinder, and the cylindrical bobbin may include a synthetic resin. The bobbin (100) may be accommodated into the yoke housing (200, described later), may be supported by first and second elastic members (300, 900. described later) and may be mounted therein with a lens (not shown).

The bobbin (100) may be arranged at a periphery thereof with a cylindrical coil (600). The coil (600) may be wound on the periphery of the bobbin (100) and arranged thereon. Furthermore, a space may be formed between the periphery of the bobbin (100) and an inner surface of the coil (600), where the space is inserted by an inner yoke (220. described later). The bobbin (100) is formed with a sill (115) configured to support a lower end of the coil (600), as shown in FIG. 2.

The bobbin (100) may be lifted up and down by a repulsive force generated by a magnetic field formed by the coil (600) and a magnetic field formed by a permanent magnet (400, described later), whereby a gap formed by a lens inserted into the bobbin (100) and an image sensor module can be adjusted.

The yoke housing (200) is made of a metal plate in the form of wrapping a periphery of the bobbin (100) in order to reduce leakage of magnetic fields generated by the permanent magnet (400) and the coil (600). The yoke housing (200) may include an outer yoke (210) and an inner yoke (220).

There is a risk of destroying the housing due to outside shock or vibration, in a case the bobbin (100) is wrapped by the conventional synthetic resin-injected housing and the metal yoke is fixed to the housing. Furthermore, there is another disadvantage in that the driving performance can be reduced due to the fact that the VCM is manufactured in a tiny size, and subsequent weak intensity of magnetic fields generated by the permanent magnet mounted on the yoke installed on the housing and the coil.

In a case the conventional synthetic resin-injected housing is replaced by the metal plate-included yoke housing (200) according to the exemplary embodiment of the present disclosure, the bobbin (100) and various constituent parts embedded inside the VCM can be inhibited from being damaged by outside shock and vibration. Furthermore, the sizes of the permanent magnet and/or coil can be increased to enhance the driving performance of VCM, in a case the yoke housing (200) functions as the conventional synthetic resin housing.

To be more specific, the outer yoke (210) of the yoke housing (200) may include a metal plate encompassing the bobbin (100) for accommodating the bobbin (100). The outer yoke (210) may prevent the magnetic fields generated by the permanent magnet (400) and the coil (600) from being leaked out and protect various constituent parts embedded in the VCM against the outside shock. The outer yoke (210) may be formed with an opening that exposes the bobbin (100).

The outer yoke (210) may include an upper surface that exposes an upper end of the bobbin (100) and a lateral surface plate (described later) extended from the upper surface towards the base (described later), and directly coupled to the base.

The inner yoke (220), at least one inner yoke (220), may be extended from an inner periphery formed by the opening formed on the upper plate of the outer yoke (210) to a direction parallel with the periphery of the bobbin (100), and may be interposed between the periphery of the bobbin (100) and the coil (600). The inner yoke (220) may be integrally formed with the outer yoke (210) in the same material as that of the outer yoke (210) in order to implement a yoke effect along with the outer yoke (210). The inner yoke (220) according to the exemplary embodiment of the present disclosure may be arranged in a position opposite to that of the permanent magnet (400), for example.

The first elastic member (300) may include an inner spring unit, an outer spring unit and a connection spring unit, where the inner spring unit may be connected to an upper end of the bobbin (100), and the connection spring unit may be connected to the inner spring unit and the outer spring unit.

The first elastic member (300) may elastically support the bobbin (100) reciprocating along an imaginary line (C. see FIG. 2) extending the center of bobbin (100). The permanent magnet (400) may be arranged on an inner surface of the outer yoke (210), and each of four permanent magnets (400) is provided at a corner of the outer yoke (210). The permanent magnet (400) is arranged on a position opposite to that of the coil (600), where the bobbin (100) is driven by the repulsive force generated by the magnetic field of the permanent magnet (400) and the magnetic field of the coil (600).

The inner yoke (220) of the yoke housing (200) may be arranged on a position opposite to that of the permanent magnet (400) to maximize the yoke effect along with the outer yoke (210). The VCM according to the exemplary embodiment of the present disclosure can be applied and implemented according to the configuration thus described, and each of the following essential constituent parts according to another exemplary embodiment of the present disclosure will be described.

The outer yoke (210) may be embedded with a first spacer (500) for fixing an outer spring of the first elastic member (300). The outer spring of the first elastic member (300) may be inserted into the first spacer (500). Furthermore, an upper end of the permanent magnet (400) is fixed by the first spacer (500). To be more specific, the permanent magnet (400) may be interposed between the first spacer (500) and a second spacer (700. described later). The first spacer (500) may include a frame (500), a support pillar (520) and a spring fixation groove (530).

The frame (510) may be fixed to an inner surface of the outer yoke (210) to secure the outer spring of the first elastic member (300). The support pillar (520) may be protruded in parallel with the bobbin (100) at a periphery of the frame (510). The support pillar (520) may secure the permanent magnet (400) along with the second spacer (700. described later).

The spring fixation groove (530) may be formed along an inner surface of the second spacer (700), and may be fixed by the outer spring of the first elastic member (300). The outer yoke (210) may include a bottom-opened square barrel type body (212), where the body (212) may include four lateral surfaces and an upper surface connected to the four lateral surfaces. The upper surface of the body (212) may be formed with a hole (214) that exposes the bobbin (100). The hole (214) has a diameter equal to or greater than an external diameter of the bobbin (100) such that the bobbin (100) may not be hindered in reciprocation.

The inner yoke (220) may be bent from an inner surface of the upper surface of the outer yoke (210) formed along the periphery of the hole (214), and positioned at a position opposite to a space between the coil (600) and the periphery of the bobbin (100).

The bobbin (100) may be protruded thereon with at least one rib (110) along a lengthwise direction of the bobbin (100), where the rib (110) may be coupled to the inner spring of the first elastic member (300). The first elastic member (300) may include an outer spring (310), an inner spring (320) and a connection spring (330). The outer spring (310) may be manufactured in a square frame shape corresponding to the inner surface of the outer yoke (210). The outer spring (310) may be secured by the spring fixation groove (530) of the first spacer (510).

The inner spring (320) may be coupled to the bobbin (100), formed with a through hole (322) correspondingly positioned to the rib (110) of the bobbin (100), and coupled by the rib (110) formed at the through hole (322) and the bobbin (110) formed at the inner spring (320), where the inner spring (320) is coupled to the bobbin (100). The connection spring (330) elastically and mutually connects the outer spring (310) and the inner spring (320).

In the exemplary embodiment of the present disclosure, the outer spring (310), the inner spring (320) and the connection spring (330) may be integrally formed. The connection spring (330) may be formed from the periphery of the inner spring (320) in a zigzag shape encompassing the inner yoke (220).

That is, the connection spring (330) is formed in a zigzag shape, and part of the zigzag shaped connection spring (330) is arranged with the inner yoke (220), as illustrated in FIG. 2. The permanent magnet (400) may be fixed between the first spacer (500) and the second spacer (700) facing the first spacer (500).

The second spacer (700) may be coupled thereunder with a base (800). The bobbin (100) is elastically supported by the first elastic member (300) coupled to the upper end of the bobbin (100) and the second elastic member (900) coupled to the bottom end of the bobbin (100) opposite to the upper end of the bobbin (100). The second elastic member (900) is coupled to the bottom end of the bobbin (100).

The second spacer (700) may secure the permanent magnet (400) along with the first spacer (500) to thereby secure the second elastic member (900). The second spacer (700) may include a frame (710) and a support pillar (720).

The frame (710) of the second spacer (700) may be arranged at an inner lateral surface of the outer yoke (210), and the support pillar (720) may be formed at a position facing each support pillar (520) of the first spacer (500) from the frame (710). The permanent magnet (400) may be secured between the first spacer (500) and the second spacer (700). The second elastic member (900) may serve to allow the elastic deformation and elastic restoration for reciprocation of the bobbin (100) at both ends of the bobbin (100) along with the first elastic member (300), and may include an outer spring (910), a terminal pin (920), an inner spring (930) and a connection spring (940). In the exemplary embodiment of the present disclosure, two second elastic members (900) may be provided, where each of the second elastic members is mutually and electrically connected.

The outer spring (910) of each second elastic member (900) may be arranged at the base (800), where the outer spring (910) of the second spring (900) may be secured between the second spacer (700) and the base (800). The terminal pin (920) may be protruded from each outer spring (910) of the each elastic member (900), and bent towards the lateral surface of the each base (800) to be secured at the lateral surface of the base (800).

The inner spring (930) may be arranged along the bottom end of the bobbin (100), and take the shape of a half ring when viewed from a plain surface. The connection spring (940) may mutually connect the inner spring (930) and the outer spring (910). At this time, the two second elastic members (910) comprising the outer spring (910), the inner spring (920) and the connection spring (930) may support the bottom end of the bobbin (100) and may be respectively and electrically connected each end of each coil (600).

The base (800) may take the shape of a hexagonal plate, may be centrally formed with an opening that exposes the bobbin (100) and may be formed at a rear surface thereof with an IR (infrared) filter, which is formed at a position corresponding to that of the opening.

The base (800) may be laterally formed with a sill (810) for supporting a distal end of the outer yoke (210) of the yoke housing (200), where the outer yoke (210) and the base (800) are directly and mutually connected. For example, the lateral surface of the base (800) may be formed with a hook, and the outer yoke (210) may be formed with a coupling hole coupled to the hook formed at the lateral surface of the base (800).

As apparent from the foregoing, it is a basic principle of the present disclosure to provide a VCM capable of solving the problems caused by the electromagnetic force by maximizing the electromagnetic force in a restricted space.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:
1. A voice coil motor comprising:
  a bobbin provided with a coil at an outer surface thereof;

at least one permanent magnet facing the coil provided at the bobbin;

a cylindrical yoke surrounding the bobbin and the permanent magnet and including a metal for shielding a magnetic field generated by the coil;

a base coupled to the yoke; and an elastic member including a first elastic member interposed between the yoke and the permanent magnet for elastically supporting the bobbin and a second elastic member interposed between the base and the permanent magnet, wherein the voice coil motor further includes a first spacer interposed between the yoke and the permanent magnet, and a second spacer interposed between the permanent magnet and the base, and wherein the first spacer includes a first frame unit interposed between the yoke and the permanent magnet and a first support pillar extended from the first frame unit to the base, and the second spacer may include a second frame unit interposed between the base and the permanent magnet and a second support pillar extended from the second frame unit to the first support pillar.

2. The voice coil motor of claim 1, wherein a part of the yoke is interposed between a periphery of the bobbin and the coil.

3. The voice coil motor of claim 1, wherein the bobbin is formed with a sill configured to support a lower end of the coil.

4. The voice coil motor of claim 1, wherein the yoke includes an outer yoke that includes an upper plate formed with an opening for opening an upper end of the bobbin and a lateral plate extended from the upper plate to the base and coupled to the base, and an inner yoke extended from an inner surface formed by the opening of the upper plate to between the coil and a periphery of the bobbin.

5. The voice coil motor of claim 4, wherein the permanent magnet is arranged at a position opposite to each inner yoke.

6. The voice coil motor of claim 1, wherein the permanent magnet is fixed between the first and second frame units.

7. The voice coil motor of claim 1, wherein the first elastic member includes an outer spring coupled to the first frame unit, an inner spring coupled to the bobbin and a connection spring connecting the outer spring and the inner spring.

8. The voice coil motor of claim 7, wherein the outer spring is inserted into an inner surface of the first frame unit.

9. The voice coil motor of claim 7, wherein the connection spring is bent in a zigzag style between the inner spring and the outer spring, and a part of the yoke passes between the connection spring to be interposed between the bobbin and the coil.

10. The voice coil motor of claim 7, wherein the bobbin is formed with at least one rib, where the rib is coupled to the inner spring.

11. The voice coil motor of claim 7, wherein the outer spring, the inner spring and the connection spring of the first elastic member are integrally formed.

12. The voice coil motor of claim 1, wherein the base is laterally formed with a sill for supporting the yoke.

* * * * *